United States Patent [19]

Diem et al.

[11] Patent Number: 4,950,058

[45] Date of Patent: Aug. 21, 1990

[54] ACTIVE MATRIX COLOR DISPLAY SCREEN WITHOUT CROSSING OF ADDRESS LINE CONDUCTORS AND COMMAND COLUMN CONDUCTORS

[75] Inventors: Bernard Diem, Echirolles; Thierry Leroux, Fontaine, both of France

[73] Assignee: Commissariat A L'Energie Atomique, Paris, France

[21] Appl. No.: 293,638

[22] Filed: Jan. 5, 1989

[30] Foreign Application Priority Data

Jan. 11, 1988 [FR] France .................. 88 00200

[51] Int. Cl.$^5$ .................. G02F 1/13; G09G 3/36
[52] U.S. Cl. .................. 350/333; 350/339 F; 340/784
[58] Field of Search .................. 350/339 F, 333, 334; 340/719, 784

[56] References Cited

U.S. PATENT DOCUMENTS

| 4,678,282 | 7/1987 | Yaniv et al. | 350/334 |
| 4,694,287 | 9/1987 | Chenevas-Daule et al. | 350/333 X |
| 4,743,099 | 5/1988 | Dickerson et al. | 350/339 F |
| 4,792,210 | 12/1988 | Maurice | 350/334 |
| 4,818,981 | 4/1989 | Oki et al. | 340/784 |
| 4,818,991 | 4/1989 | Gay | 340/784 |
| 4,822,144 | 4/1989 | Vriens | 350/339 F |
| 4,834,505 | 5/1989 | Migliorato et al. | 350/333 |

FOREIGN PATENT DOCUMENTS 0228317 11/1986 European Pat. Off. .

Primary Examiner—Stanley D. Miller
Assistant Examiner—Huy K. Mai
Attorney, Agent, or Firm—Nilles & Nilles

[57] ABSTRACT

The elemental image points of color red, green blue forming a color image point are disposed in a triangle. An elemental image point is comprised of a thin film transistor connected to an electrode of a condenser, this electrode facing a second, colored electrode. The electrodes connected to a transistor are arrayed in lines, the other in columns. Each column of electrodes corresponding to a color successively red, green, blue. Three electrodes connected to three thin film transistors and forming a color image point are connected to one and the same address line conductor.

1 Claim, 3 Drawing Sheets

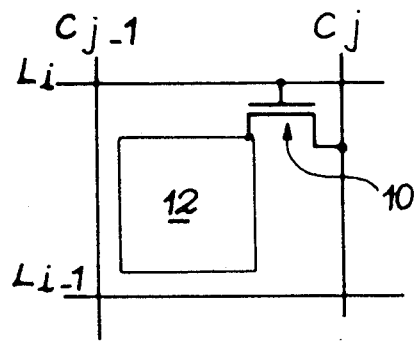
FIG. 1
PRIOR ART
FIG. 2A
PRIOR ART
FIG. 2B
PRIOR ART
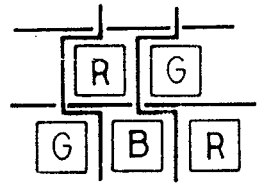
FIG. 2C
PRIOR ART
FIG. 3A
PRIOR ART
FIG. 3B
PRIOR ART

ACTIVE MATRIX COLOR DISPLAY SCREEN WITHOUT CROSSING OF ADDRESS LINE CONDUCTORS AND COMMAND COLUMN CONDUCTORS

BACKGROUND OF THE INVENTION

1. Field of the Ivention

The present invention relates to an active matrix color display screen without crossing of address line conductors and command column conductors. It is applicable to the display of fixed images, such as printed texts generated by word processors as well as to the display of animated images, such as TV images.

2. Description of Related Art

Active matrix liquid crystal color display screens are produced by associating two surfaces that encloses a liquid crystal.

FIG. 1 (Prior Art) depicts the elements disposed in a known manner on the first surface and constituting an elemental image point (pixel, in the International Language).

A thin film transistor 10 is connected at its base to a conducting line Li, at its collector to a conducting column Cj, and at its emitter to an electrode 12. The second surface is covered with colored electrodes forming a mosaic of filters of the three primary colors, red, green and blue, in the steps of the matrix.

Three principal types of arrangement of the mosaic of filters are currently utilized. They are depicted in FIG. 2 (Prior Art). One point of color image comprises three elemental image points of the colors red, blue and green. The elemental images points are symbolized by the squares; the colors attributed to them are noted: R:red, G:green, B:blue.

In FIG. 2A (Prior Art) there is represented the structure called "in bands." This configuration permits the stocking of three informations, R, G, B, simultaneously, but this arrangement of the filters is not visually favorable.

A structure of the "diagonal" type is depicted in FIG. 2B (Prior Art). This structure, more attractive visually than the preceding one, presents the disadvantage of a very complex addressing of the screen: a point of color image is distributed to two lines; the three colors are assigned to one and the same column.

A structure of the "triangle" type is depicted by FIG. 2C (Prior Art). The advantages concerning the visual comfort of this structure in relation to the two preceding ones are brought out in the article "Color pixel arrangement evaluation for LC-TV" by S. Tsuruta, K. Mitsuhashi and K. Noguchi appearing in the report of the 1985 international display research conference, p. 24.

FIG. 3 (Prior Art) depicts two known arrangements for putting the "triangle" structure into practice.

FIG. 3A (Prior Art) relates to the article "An amorphous-Si TFT addressed 3.2 in full color LCD" by F. Funada, Y. Takafuji, K. Yano, H. Take and M. Matsuura appearing in the SLD 86 digest report, p. 292.

This structure presents the disadvantage of elongating the length of the column conductors which must make zigzags between the electrodes corresponding to the image points, in such a manner as to be able to stagger the image points by a half step between two consecutive lines.

It is known, moreover, that the problems of fabrication become increasingly important with lengthening conductor runs; for example, the risks of short circuits and breaks are multiplied.

FIG. 3B (Prior Art) depicts a second possibility for putting into practice the "triangle" structure. This is described in the article "A high picture quality LC-TV using triangle trio-color dots" by Saito and his collaborators appearing in the report of the 1985 international display research conference, p. 27. This time, a color of an image point color puts in play two elemental image points of the same color. To each elemental image point there is assigned a thin film transistor. The problem posed by this proposed configuration is the large number of thin film transistors which makes addressing more complex, the production of the matrix more delicate, and which burdens the cost of fabrication.

SUMMARY OF THE INVENTION

The present invention, while retaining the advantage of the visual comfort of the "triangle" structure, permits simplification of the means employed for addressing of the image points.

In effect the invention contemplates placing the line conductors and the column conductors on the first and on the second surface, respectively. Moreover, the three elementary image points forming a color image point are addressed simultaneously by the medium of a single line conductor, which has the effect of simplifying the address circuitry, of reducing the lengths of the conductors, and of thus diminishing the number of short circuits. This configuration permits the number of thin film transistors that are necessary for the production of the FIG. 3B (Prior Art) configuration to be divided by two for an even number of color image points. For a screen of $M \times N$ image points according to the invention, there are utilized M lines and 3N columns, which corresponds to $3M \times N$ thin film transistors or, further, to $M+3N$ connections, while for a screen such as FIG. 3A (Prior Art) shows there are 2M lines and $3N/2$ columns which correspond to $3M \times N$ transistors or, further, $2M+(3N/2)$ connections, and for a screen such as FIG. 3B (Prior Art) shows there are $6M \times N$ transistors or, further, $M+3N$ connections. In relation to screens of the prior art there is a reduction of either the number of thin film transistors or the number of connections. Besides involving a reduction in the cost of manufacture, this simplifies the production of the screen.

The electrodes connected by a conductor column are all assigned to filters to the same color red, green or blue. This permits utilization of a simple and very effective method of electrodeposition for the production of these filters.

More specifically, the present invention has for its object an active matrix display screen in color without crossings of address line conductors and command column conductors, comprising a liquid crystal interposed between a first surface and a second transparent surface, said screen comprising a plurality of points of color image, each point of color image being formed of three elemental image points of the color red, green and blue disposed in a triangle, each elemental image point consisting on the first surface of a thin film transistor connected to an electrode of a condenser, a second electrode of that condenser being on the second surface, the electrodes of the first surface being arrayed in lines, the electrodes of the second surface being arrayed in columns, each column of electrodes corresponding to a color red, green, blue in succession, and the electrodes of a column being connected between themselves by a column conductor. Each line of address conductor being common to two adjacent lines of electrodes, each conductor biased by a reference potential beind common to two adjacent lines of electrodes, at one side of a line of electrodes and paralleling this there is a line conductor and at the other side of this line of electrodes and paralleling it there is a conductor biased with a reference potential.

Other characteristics and advantages of the invention will better appear from the following description, which is to be taken as purely illustrative and in no way limiting, with reference to FIGS. 1 to 6, wherein:

BRIEF DESCRIPTION OF THE DRAWINGS

FIGS. 1, 2A, 2B, 2C, 3A and 3B depict prior art pixel arrangements;

DESCRIPTION OF PREFERRED EMBODIMENTS

Figure 4:
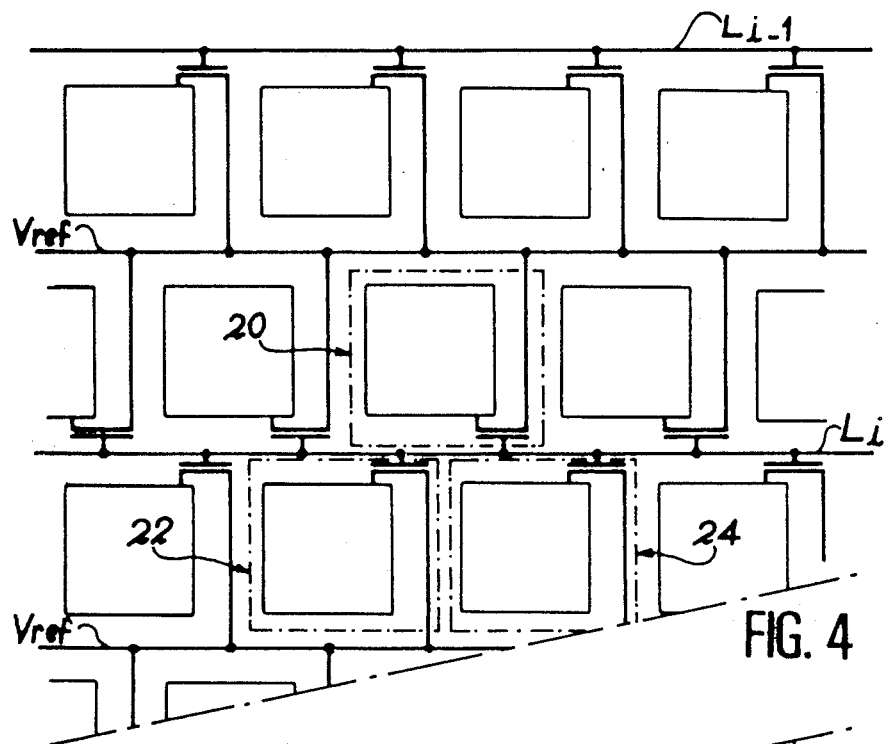
FIG. 4 illustrates a disposition according to the invention of the elements of elemental image points disposed on the first surface.

FIG. 4 illustrates the elements of the elemental image points disposed on the first surface. These elements 20 are a thin film transistor of the a-Si:H type and an electrode. The emitter of the transistor is connected to the electrode, while its base is connected to a line conductor Li and its collector is biased by a reference potential Vref. i is a general designator which represents the number of the line conductor. In the figure two consecutive line conductors Li−1 and Li are designated, the line conductor following Li being designated Li+1. It can be seen in FIG. 4 that the electrodes are arrayed in line; on one side of a line of electrodes and parallel to it there is a line conductor, at the other side of this line of electrodes and parallel to it there is a conductor biased with a reference potential Vref. Three elemental image points 20, 22, 24 of the same color image point are connected to the same line conductor Li. The values of the address voltage applied to the line conductors and of the reference voltages depend upon the liquid crystal employed and upon the characteristics of the transistors.

Figure 5:
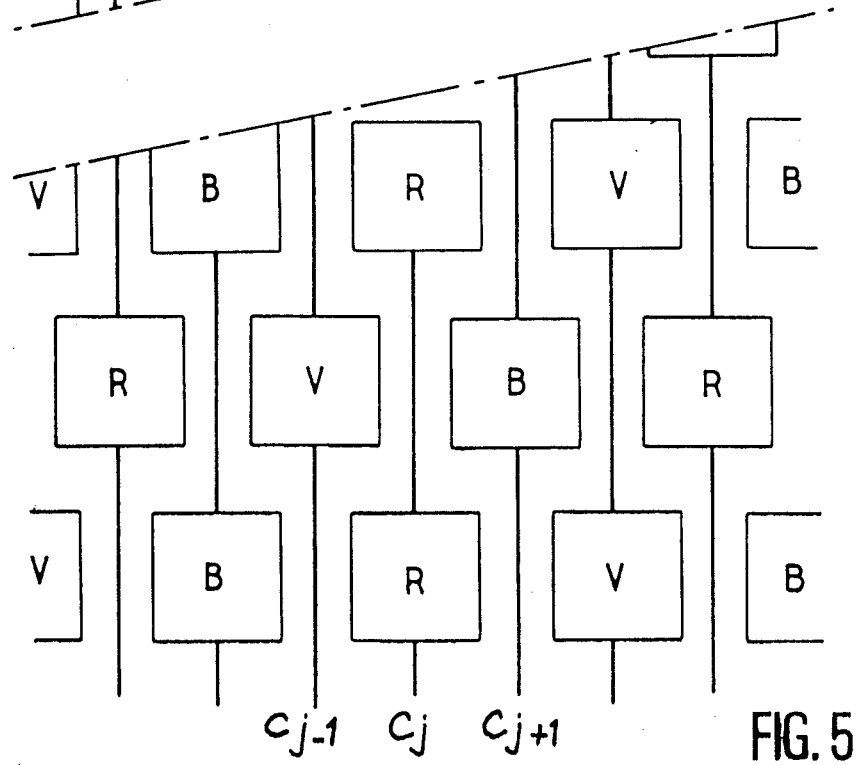
FIG. 5 illustrates a disposition according to the invention of the elements of elemental image points disposed on the second surface.

FIG. 5 represents an arrangement according to the invention of electrodes disposed on the second surface. These electrodes are arrayed in columns, one column corresponding to one color red R, green G, or blue B. The electrodes of one and the same column are connected by a column conductor Cj. j is a general designator which represents the number of the column conductor. In the figure, three consecutive column conductors are designated Cj−1, Cj and Cj+1.

The disposition of the different colored filters deposited on the electrodes permits them to be produced easily by an electrodeposition method.

Figure 6:
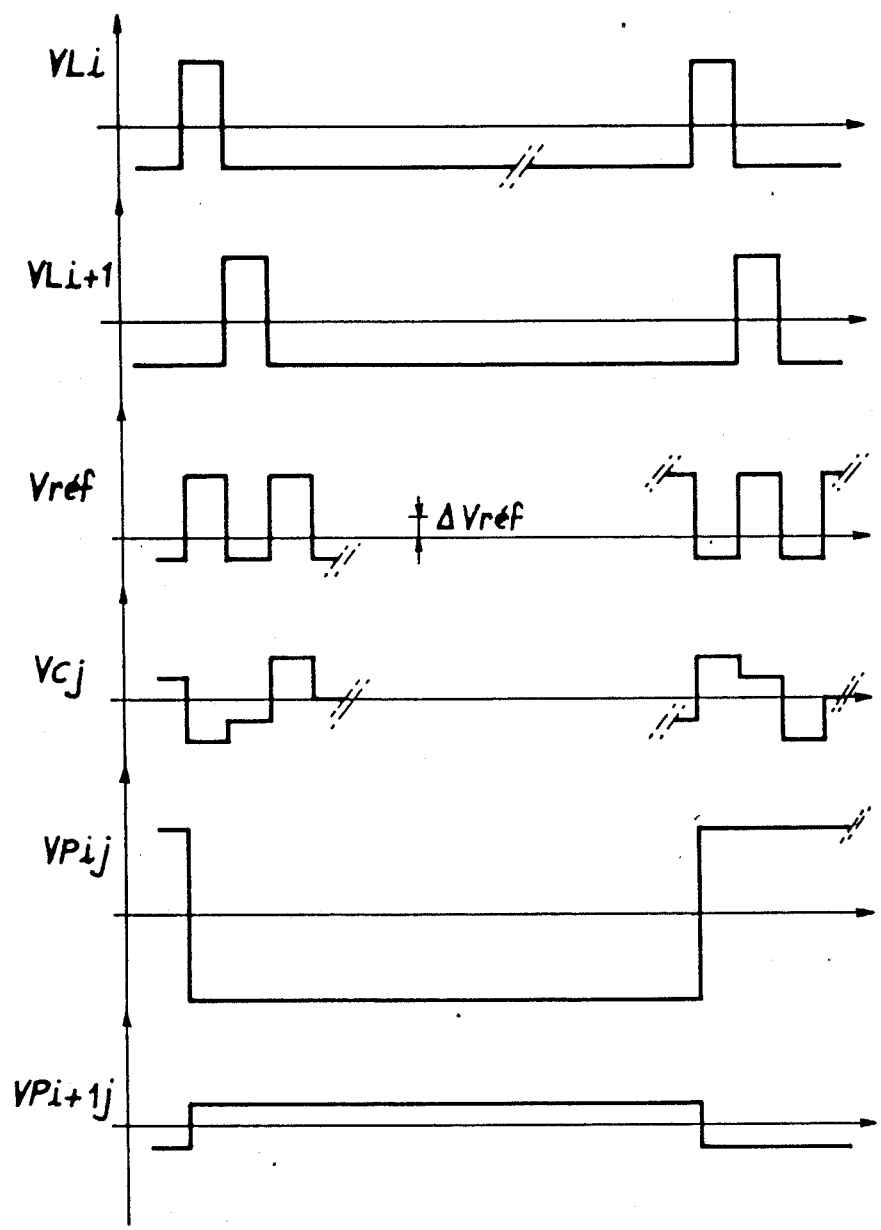
FIG. 6 illustrates the chronograms of the variations of the voltage Vref and the voltages VLi, VLi+1 and VCj applied to the consecutive line conductors Li and Li+1 and to a column conductor Cj in the case where the elemental image points corresponding to the crossing of the line conductors Li and Li+1 and of the column conductor Cj are energized.

In FIG. 6 can be seen chronograms corresponding to variations of the voltage Vref and the voltage VLi and VLi+1 applied to the line conductors Li and Li+1 as well as of the voltage VCj applied to a column conductor Cj when the elemental image points corresponding to the crossings of these line conductors and of this column conductor are energized.

In a general way, the adddressing of active matrices consists in successively validating the line conductors periodically, the period being called the progression time T. The different image points corresponding to a validated line conductor and which ought to be energized are energized by the command voltages VCj applied to the columns. The voltage applied between the electrodes of an image point correspond to the difference VCj−Vref.

To guarantee a sufficiently long life duration to the employed liquid crystal, the phase of the address voltage is inverted on the successive line conductors and for a given line conductor, with every progression. This expedient permits having an average power, dissipated in the liquid crystal, of zero.

The very structure of a thin film transistor causes it to appear as a parasitic capacitor at the level of the base during addressing. This parasitic element involves the appearance of a continuous voltage component which disturbs the good addressing of the image points. In order to compensate for this phenomenon, a continuous voltage $\Delta$Vref is added to the reference voltage Vref.

The voltage effectively applied between the electrodes of an image point (ij) corresponds to $$VPij = VCj - Vref + \Delta Vref.$$

We claim:

1. Active matrix color display screen without crossing of address line conductors (Li, Li−1) and signal column conductors (Cj−1; Cj; Cj+2), comprising:
   a first surface and a second transparent surface;
   a liquid crystal interposed between the first and second surfaces;
   a plurality of color image points, each color image point being formed of three elemental image points (20, 22, 24) of the color red, green and blue disposed in a triangle in the plane of the display screen;
   each elemental image point (20, 22, 24) comprising a liquid crystal cell being formed of a first electrode on the first surface, a second electrode (R, G, B) on the second surface, the liquid crystal contained between the first and second electrodes, and a thin film transistor being located on the first surface, said transistor being connected at its base to an address line conductor (Li, Li−1), at its collector to a reference potential conductor (Vref), and at its emitter to the first electrode of the liquid crystal cell;
   the first electrodes of the first surface being arranged in a plurality of lines of first electrodes;
   the second electrodes (R, G, B) of the second surface being arranged in a plurality of columns of second electrodes, each column of second electrodes corresponding to a color successively red, green, blue, and the second electrodes (R, G, B) of a column being connected between themselves by a signal column conductor (Cj−1; Cj; Cj+1);
   each address line conductor (Li, Li−1) being common to two adjacent lines of first electrodes, each reference potential conductor (Vref) being common to two adjacent lines of first electrodes, whereby at one side of a given line of first electrodes and paralleling that given line there is an address line conductor (Li, Li−1) and on the other side of that given line of first electrodes and paralleling that given line there is a reference potential conductor (Vref).

* * * * *